Oct. 12, 1926.
A. L. ROBB
1,602,856
GREASE GUN
Filed April 16, 1923    2 Sheets-Sheet 1
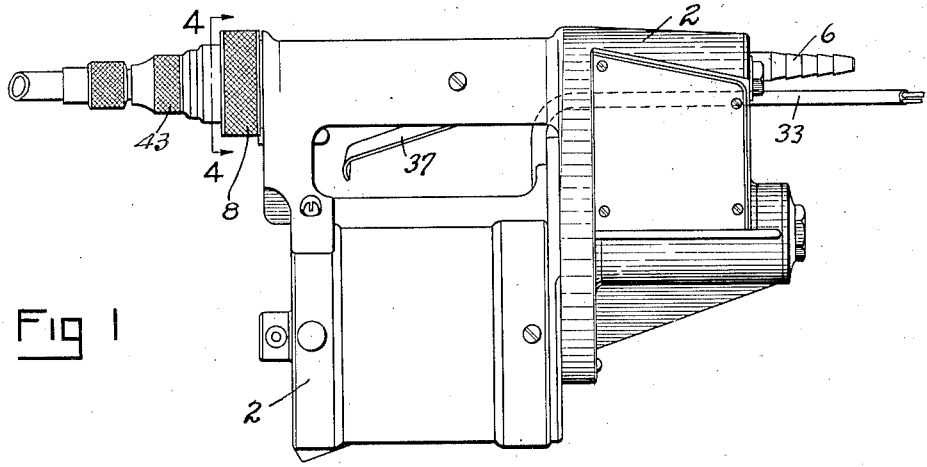
Fig 1
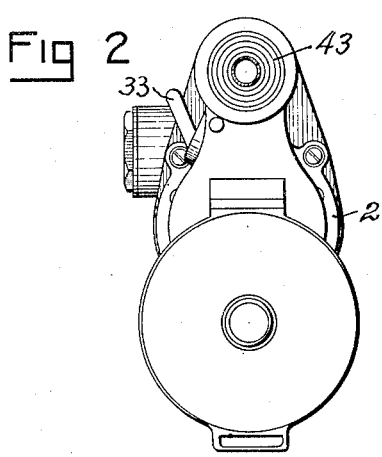
Fig 2
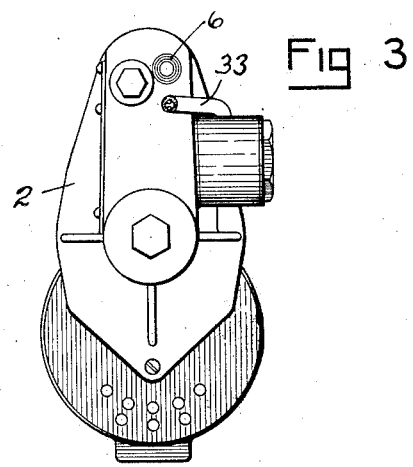
Fig 3
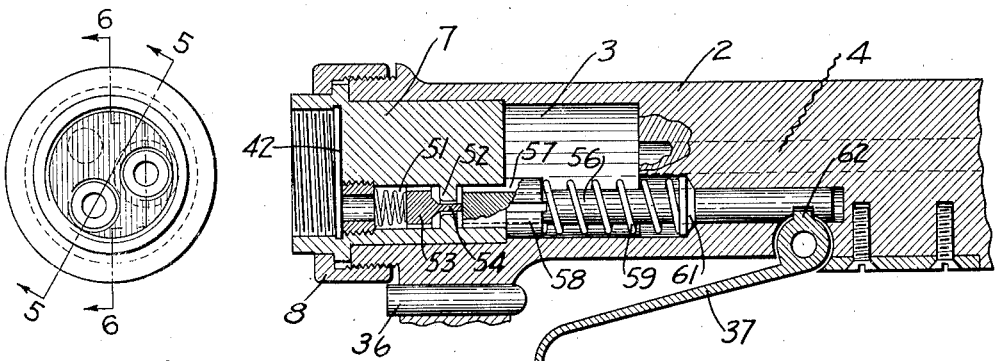
Fig 4
Fig 5
WITNESS
INVENTOR
ALEX L. ROBB
BY
ATTORNEYS

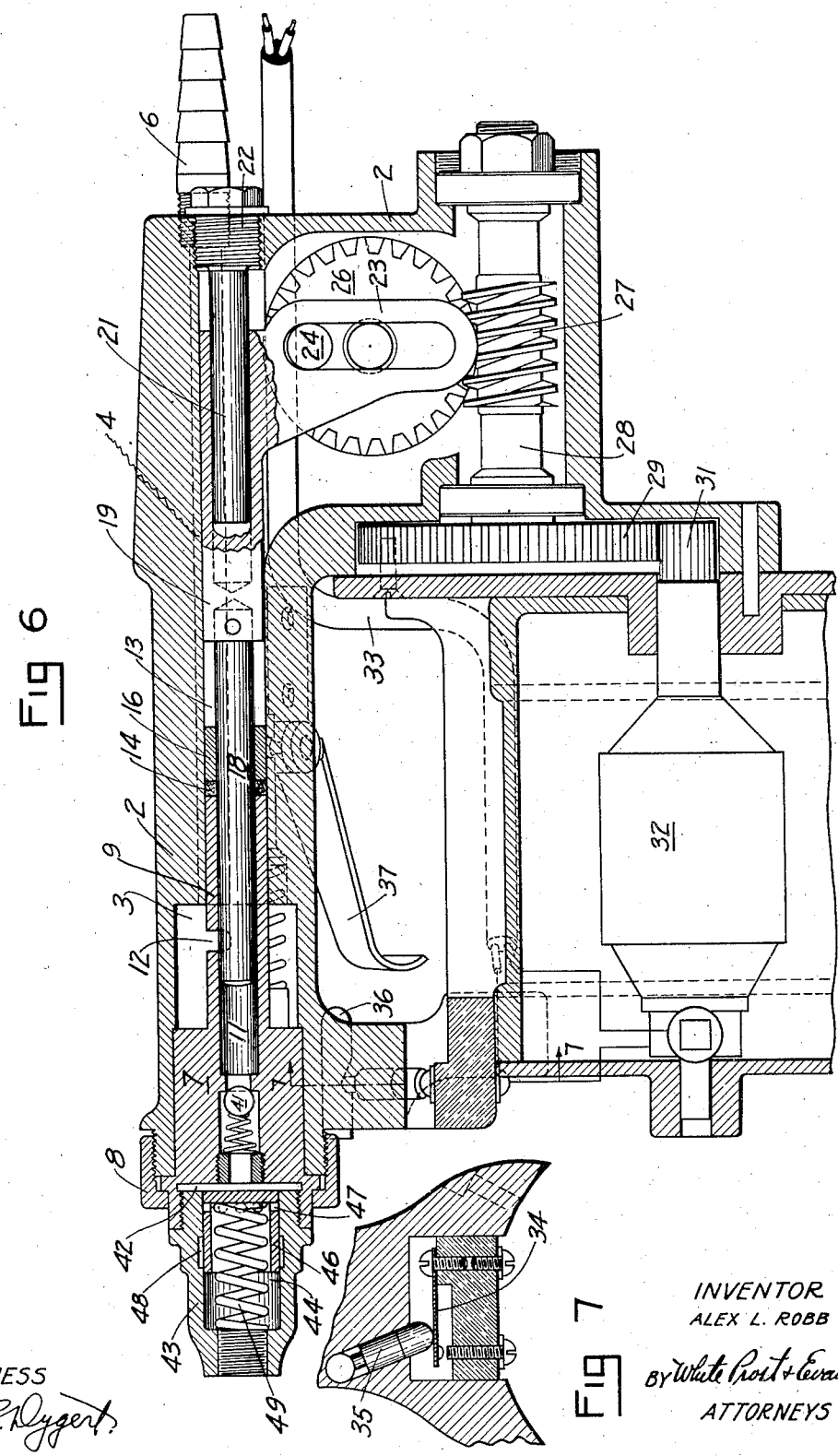

Patented Oct. 12, 1926.

1,602,856

UNITED STATES PATENT OFFICE.

ALEX L. ROBB, OF FRESNO, CALIFORNIA, ASSIGNOR OF ONE-FOURTH TO C. H. SPEKKER AND ONE-FOURTH TO O. D. CARTER, BOTH OF FRESNO, CALIFORNIA.

GREASE GUN.

Application filed April 16, 1923. Serial No. 632,186.

The invention relates to lubricating devices and especially to apparatus for injecting lubricant into bearings under pressure. One of the objects of the invention is the provision of a device for readily injecting a lubricant under high pressure into a bearing, the entire operation of the device being controlled automatically from a single manually operated lever.

Another object of the invention is the provision of a device of the character described, in which the lubricant in the discharge passage is set back automatically upon the release of the pressure on the lubricant so that when the connection between the device and the bearing to which it is applied is severed no lubricant is lost.

Another object of the invention is the provision of a lubricating device in which very high pressures are available without the large and complicated mechanisms heretofore necessary. Another object of the invention is the provision of a compact and readily portable device, which can be carried in one hand and controlled by the manipulation of a single lever forming part of the grip or handle of the device.

My invention includes many other objects and features of advantage, some of which with the foregoing, will be set forth in the following description of my invention. It is to be understood that I do not limit myself to the showing made by the said description, as I may adopt variant forms of the invention within the scope of the claims.

Referring to the drawings: Fig. 1 is a side elevation of a grease gun in accordance with my invention, and Figs. 2 and 3 are, respectively, left and right hand elevations. Fig. 4 is a vertical sectional view, the plane of section being taken on the line 4—4 of Fig. 1. Fig. 5 is a sectional view, the plane of section being indicated by the line 5—5 of Fig. 4. Fig. 6 is a vertical sectional view, the plane of section being indicated by the line 6—6 of Fig. 4. Fig. 7 is a sectional view of a portion of the device, the plane of section being indicated by the line 7—7 of Fig. 6.

In terms of broad inclusion, the lubricating apparatus of my invention comprises a device readily carried about in the hand of the user and connected by a suitable flexible conduit with a source of lubricant under low pressure sufficient to insure the flow of lubricant from the source of supply to the device when the latter is in operation. The device is also connected, by a suitable cable, with a source of electric energy for operating the pressure pump included in the device, and is further equipped with a short hose of convenient length, provided with any suitable form of coupling, for connecting the device to the bearing which is to be lubricated. A housing, conveniently formed in a number of pieces, encloses a plunger pump, and a motor for operating the same thru suitable reduction gearing. The housing encloses a supply chamber into which lubricant from the source of supply flows thru the supply line under light pressure, say three or four pounds, or sufficient to insure that the supply chamber shall be replenished with lubricant as fast as the pump consumes it. The pump injects lubricant from the supply chamber past a check valve into a pressure chamber having a discharge passage thru which the lubricant passes to the connecting hose and to the bearing.

Disposed between the pressure chamber and the discharge passages is a piston valve held in the closed position by a spring, and capable of being forced back by the pressure of the lubricant from the pump to the open position, that is, when the pump is forcing lubricant to the delivery hose and bearing, the piston valve is retracted against a spring which tends to effect the recovery movement of the piston valve. When the pump is stopped, a by-pass between the pressure chamber and the supply chamber, is automatically opened to relieve the pressure in the pressure chamber and permit the piston to recover to closed position, thus forcing some of the lubricant in the pressure chamber thru the by-pass and back into the supply chamber. The recovery movement of the piston valve exerts a suction in the discharge passage causing the lubricant in the discharge passage and delivery hose to be drawn back so that the connection between the hose and the bearing can be broken without leakage of lubricant. Viewed from another angle the piston valve may be regarded as means for oppositely varying the volumes of the discharge passage and pressure chamber, enlarging the pressure chamber and decreasing the discharge passage when the pump is in operation, and when the pump is inactive decreasing the pressure chamber, which is permitted by the escape of the lubricant thru the by-pass into the supply chamber, and enlarging in corresponding degree the discharge passage so that the lubricant in the discharge passage and hose is sucked back from the hose coupling.

The device is provided with a grip, including a lever movable by the fingers when clasped about the grip. Pressure of the fingers on the lever effects the closing of a switch for energizing the motor to drive the pump, and at the same time, actuating devices for permitting the closure of the by-pass between the pressure chamber and the supply chamber so that the lubricant from the pump is forced thru the discharge passage. With the release of the lever, by the loosening of the finger pressure thereon, the switch is opened, so that the motor and pump stop, and concurrently the by-pass is opened so as to permit the piston valve to recover. Thus the entire operation of the device is automatically controlled by the small movement of the control lever in the grip, and lubricant under very high pressure is injected into the bearing with which the device is connected, and immediately following the stopping of the pump the lubricant is withdrawn sufficiently in the delivery hose to prevent loss or leakage therefrom when it is disconnected from the bearing.

In detail, my lubricating device comprises a housing 2 enclosing a supply chamber 3, connected by the passage 4, to a nipple 6, adapted to receive the end of a conduit leading to a tank or reservoir containing lubricant under low pressure sufficient to insure the flow of the lubricant to the supply chamber 3 during the operation of the pump. The end of the supply chamber is closed by a plug 7 and held therein by a flanged ring 8, threaded on the end of the housing. The plug 7 is provided with a tubular extension 9 forming a pump casing 11 which may be placed in communication with the supply chamber by a port 12 cut therein. The pump casing 9 seats in a bore 13, extending thru the casing parallel to the passage 4, and a packing 14 interposed between the end of the pump casing and a collar 16, fixed in the bore, prevents leakage of lubricant past the end of the pump casing.

Slidably arranged in the pump casing is a plunger 18 fixed in the cross head 19, also slidably mounted in the bore and on the pin 21, the enlarged end 22 of which is threaded into and closes the outer end of the bore 13. The cross head is actuated by a Scotch yoke 23 engaging the pin 24, on the worm wheel 26, journaled in the housing 2. The worm wheel is driven by the worm 27 on the shaft 28, which also carries the spur gear 29, in mesh with the pinion 31, on the shaft of the motor 32, also enclosed within the housing, and connected by a conduit 33 with a source of electrical energy. The motor is controlled by a switch including the resilient arm 34, Fig. 7, adapted to be pressed into the closing position, by a plunger 35, which in turn is operated by a cam pin 36, so positioned as to be engaged by the lever 37 pivotally mounted on the housing in that portion which serves as a grip for the hand of the user. As the lever is moved inwardly toward the grip the switch is actuated to close the circuit and start the motor, the circuit being broken when the pin 36 is released by the outward or recovery movement of the lever 37.

As the plunger 18 is retracted in the pump casing, past the port 12, lubricant from the supply chamber 3 fills the bore of the pump casing flowing thereto by reason of the partial vacuum created in the pump chamber and the positive pressure on the lubricant in the supply chamber. On the pressure stroke of the plunger the lubricant in the pump chamber is forced past the check valve 41, and into the pressure chamber 42, formed in the end of the plug 7 by the cylindrical block 43, in which is formed a bore 44, comprising a portion of the discharge passage thru which the lubricant passes to the delivery hose.

Disposed in the bore 44, is a piston valve 46, in which are formed passages 47 adapted to be alined with the annular groove 48 in the face of the bore. A spring 49 resiliently presses the piston toward its closed position in which position the pressure chamber is at its smallest volume and the discharge passage at its largest volume.

Under pressure of the lubricant forced into the pressure chamber by the pump, the piston valve is retracted until the passages 47 are in register with the groove 48, at which time, lubricant flows thru the passages 47 into the discharge passage and out thru the delivery hose. With the release of the pressure on the lubricant in the pressure chamber, spring 49 effects the recovery movement of the piston valve which then exerts a suction effect on the entire discharge passage, sucking the lubricant backward therein and preventing effectually, any leakage or dropping from the end of the delivery hose.

Means are provided for releasing the pressure in the pressure chamber concurrently with the stopping of the pump so that the piston valve may function, since it is obvious that the piston valve cannot move back to closed position without providing for the escape of a corresponding quantity of the lubricant in the pressure chamber.

Formed in the plug 7 between the pressure chamber and the supply chamber is a by-pass 51 provided with a valve seat 52, and adapted to be closed by the spring-pressed valve 53 when the lubricant in the pressure chamber is under pump pressure. The valve is provided with a stem 54 adapted to engage the end of a rod 56 slidably mounted at one end in the end of the by-pass 51 and at the other end in the housing 2. The end of the rod seating in the by-pass is provided with grooves 57 to permit the passage of lubricant, and a flange 58 formed at this end of the rod is normally seated against the plug 7 by the spring 59 interposed between the rod and the housing 2. A leather packing 61 held by the spring serves to prevent the passage of lubricant between the rod and the housing.

The control lever 37 is provided with a lug 62, engaged in a recess in the rod, and the normal position of the parts is such that when the control lever is in its outer or recovered position, the rod is in position to hold open the valve 53. Movement of the lever 37 to its inner position to close the motor switch and start the pump, retracts the rod 56, and permits the spring-pressed valve 53 to close, so that the lubricant under pressure in the pressure chamber cannot escape thru the by-pass. When the pressure of the fingers of the operator is removed from the control lever 37, the spring 59 effects the recovery movement of the lever to its outer position, and moves the rod to seat the flange 58 against the block, thus holding open the valve 53, and providing a means of escape for the lubricant from the pressure chamber back to the supply chamber under the compressive effect exerted by the closing piston valve 46. It will of course be understood that the spring 49, actuating the piston valve, is of sufficient strength to overcome the low pressure maintained on the lubricant in the supply chamber.

It will be noted that the device is constructed so that the parts are readily disassembled for cleaning or repairs, and as readily reassembled.

I claim:

1. A grease gun comprising a casing enclosing a supply chamber and a pressure chamber having a discharge passage, means for injecting grease from the supply chamber into the pressure chamber, means for opening a passage from said pressure chamber to said supply chamber, and means controlling said discharge passage and movable to enlarge said pressure chamber during the injection of the grease and to contract said pressure chamber when the passage from the pressure chamber to the supply chamber is opened.

2. A grease gun comprising a casing enclosing a supply chamber and a pressure chamber having a discharge passage, means for injecting grease from the supply chamber into the pressure chamber, means for opening a passage from said pressure chamber to said supply chamber, a piston valve movable to enlarge said pressure chamber and admit grease into said discharge passage during the injection of the grease into the pressure chamber, and means for effecting the recovery movement of said piston valve when the passage from the pressure chamber to the supply chamber is opened.

3. A grease gun comprising a casing enclosing a supply chamber and a pressure chamber having a discharge passage, means for injecting grease from the supply chamber into the pressure chamber, a piston valve interposed between the pressure chamber and the discharge passage for controlling the flow of grease into the discharge passage and adapted to open under the pressure of grease in the pressure chamber, a relief valve interposed between the pressure and supply chambers and adapted to close under the pressure of grease in the pressure chamber, a spring for effecting the recovery of the piston valve to closed position, and means for opening the relief valve.

4. A grease gun comprising a casing enclosing a supply chamber and a pressure chamber having a discharge passage, a piston valve interposed between the pressure chamber and the discharge passage for controlling the flow of grease into the discharge passage and adapted to open under the pressure of grease in the pressure chamber, a relief valve interposed between the pressure and supply chambers, a spring for effecting the recovery of the piston valve to closed position, means for injecting grease from the supply chamber into the pressure chamber, and means for closing the relief valve and concurrently initiating the operation of said grease injecting means.

5. A grease gun comprising a casing enclosing a supply chamber and a pressure chamber having a discharge passage, a piston valve interposed between the pressure chamber and the discharge passage for controlling the flow of grease into the discharge passage and adapted to open under the pressure of grease in the pressure chamber, a relief valve interposed between the pressure and supply chambers, a spring for effecting the recovery of the piston valve to closed position, a pump for injecting grease from the supply chamber into the pressure chamber, a motor for driving the pump, and means for closing the relief valve and concurrently starting said motor.

6. A grease gun comprising a casing enclosing a supply chamber and a pressure chamber having a discharge passage, a piston valve interposed between the pressure chamber and the discharge passage for controlling the flow of grease into the discharge passage and adapted to open under the pressure of grease in the pressure chamber, a relief valve interposed between the pressure and supply chambers, and adapted to close under the pressure of grease in the pressure chamber, a spring for effecting the recovery of the piston valve to closed position, a pump for injecting grease from the supply chamber into the pressure chamber, a motor for driving the pump, means for holding the relief valve open, and means for retracting said holding means to permit the relief valve to close and concurrently starting said motor.

7. A grease gun comprising a casing enclosing a supply chamber and a pressure chamber having a discharge passage, a piston valve interposed between the pressure chamber and the discharge passage for controlling the flow of grease into the discharge passage and adapted to open under the pressure of grease in the pressure chamber, a relief valve interposed between the pressure and supply chambers, and adapted to close under the pressure of grease in the pressure chamber, a spring for effecting the recovery of the piston valve to closed position, a pump for injecting grease from the supply chamber into the pressure chamber, a motor for driving the pump, means for holding the relief valve open, a hand grip including a lever for retracting said holding means to permit the relief valve to close, and means operated by said lever for starting said motor.

8. A grease gun comprising a casing enclosing a supply chamber and a pressure chamber having a discharge passage, a piston valve interposed between the pressure chamber and the discharge passage for controlling the flow of grease into the discharge passage and adapted to open under the pressure of grease in the pressure chamber, a relief valve interposed between the pressure and supply chambers, and adapted to close under the pressure of grease in the pressure chamber, a spring for effecting the recovery of the piston valve to closed position, a pump for injecting grease from the supply chamber into the pressure chamber, an electric motor for driving the pump, a hand grip including a lever, means connected to said lever for holding open the relief valve, and a switch for said motor operated by said lever.

9. A grease gun comprising a casing enclosing a supply chamber and a pressure chamber having a discharge passage, a piston valve interposed between the pressure chamber and the discharge passage for controlling the flow of grease into the discharge passage and adapted to open under the pressure of grease in the pressure chamber, a spring-pressed relief valve interposed between the pressure and supply chambers and adapted to close under the pressure of grease in the pressure chamber, a spring for effecting the recovery of the piston valve to closed position, a spring-pressed rod for holding open the relief valve, a pump for injecting grease from the supply chamber into the pressure chamber, a motor for driving the pump, a handle for retracting said rod to permit the relief valve to close, and a switch for said motor operated by said handle.

10. A grease gun comprising a casing enclosing a supply chamber and a pressure chamber having a discharge passage, a pump for injecting grease from the supply chamber into the pressure chamber, a spring-pressed piston valve interposed between the pressure chamber and the discharge passage and adapted to be moved to open position against the tension of the spring by the pressure of the grease from said pump, manually controlled means for driving said pump, and means actuated concurrently with said pump for opening a by-pass between the pressure and supply chambers when said pump is inactive and closing said by-pass when said pump is active.

In testimony whereof, I have hereunto set my hand.

ALEX L. ROBB.